(12) United States Patent
Panchapakesan et al.

(10) Patent No.: US 10,021,050 B2
(45) Date of Patent: Jul. 10, 2018

(54) SECURE CONVERSATION AND DOCUMENT BINDER

(71) Applicant: AIRWATCH LLC, Atlanta, GA (US)

(72) Inventors: Ramani Panchapakesan, Bangalore (IN); Manjunath Bhat, Bangalore (IN); Sridhara Babu Kommireddy, Atlanta, GA (US); Anil Jagarlamudi, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 533 days.

(21) Appl. No.: 14/690,498

(22) Filed: Apr. 20, 2015

(65) Prior Publication Data

US 2016/0191432 A1    Jun. 30, 2016

(30) Foreign Application Priority Data

Dec. 31, 2014    (IN) ........................... 6851/CHE/2014

(51) Int. Cl.
| | |
|---|---|
| *H04L 12/58* | (2006.01) |
| *H04L 12/18* | (2006.01) |
| *H04L 29/06* | (2006.01) |
| *G06F 17/30* | (2006.01) |

(52) U.S. Cl.
CPC ........ *H04L 51/08* (2013.01); *G06F 17/30893* (2013.01); *H04L 12/1831* (2013.01); *H04L 63/101* (2013.01)

(58) Field of Classification Search
CPC .... G06Q 10/10; G06Q 10/107; G06Q 10/103; G06F 17/30011; G06F 17/30893; H04L 12/1831; H04L 12/1813; H04L 12/1822; H04L 51/04; H04L 51/08; H04L 51/32; H04L 51/16; H04L 51/36; H04L 51/34; H04L 51/28; H04L 51/06; H04L 63/101; H04L 65/403
USPC ......... 707/E17.008, 608; 709/203, 206, 217, 709/204, 223; 715/229, 230, 752, 753, 715/758, 751
See application file for complete search history.

(56) References Cited

U.S. PATENT DOCUMENTS

| | | | |
|---|---|---|---|
| 2003/0058752 A1* | 3/2003 | Birnbach | G09B 19/00 369/19 |
| 2007/0189718 A1* | 8/2007 | Kobayashi | G11B 20/00086 386/230 |
| 2007/0214485 A1* | 9/2007 | Bodin | G06F 17/30905 725/101 |

(Continued)

*Primary Examiner* — Ninos Donabed
(74) *Attorney, Agent, or Firm* — Thomas | Horstemeyer, LLP

(57) ABSTRACT

Disclosed are various embodiments for maintaining a collection of documents and user-defined messages made in conversations such that the collection may be accessed in a secure and manageable manner. A user-defined message may be stored by a collection control application in at least one data store according to a message storage policy and a portion of the user-defined message may be associated with at least one file in a collection of files. A manifest may be generated that enables access to the portion of the user-defined message and the at least one file. The manifest may comprise a location reference for each of the plurality of files in the collection of files and the user-defined message and an indication that the portion of the user-defined message is associated with the at least one file in the collection of files.

20 Claims, 11 Drawing Sheets

(56) References Cited

U.S. PATENT DOCUMENTS

| | | | |
|---|---|---|---|
| 2008/0201705 A1* | 8/2008 | Wookey | G06F 8/658 |
| | | | 717/175 |
| 2009/0106271 A1* | 4/2009 | Chieu | G06F 17/30929 |
| 2009/0210549 A1* | 8/2009 | Hudson | D01D 5/423 |
| | | | 709/231 |
| 2009/0249348 A1* | 10/2009 | Xu | H04L 51/16 |
| | | | 718/102 |
| 2012/0233130 A1* | 9/2012 | Vedachalam | G06Q 10/107 |
| | | | 707/673 |
| 2013/0191460 A1* | 7/2013 | Caldwell | G06Q 10/107 |
| | | | 709/206 |
| 2014/0095505 A1* | 4/2014 | Blanchflower | G06F 17/30091 |
| | | | 707/737 |
| 2014/0181157 A1* | 6/2014 | Houston | G06F 17/30312 |
| | | | 707/812 |
| 2014/0208095 A1* | 7/2014 | Stuntebeck | H04L 63/06 |
| | | | 713/152 |
| 2014/0280602 A1* | 9/2014 | Quatrano | H04L 67/02 |
| | | | 709/205 |
| 2015/0007239 A1* | 1/2015 | Cranman | H04N 21/2402 |
| | | | 725/95 |
| 2015/0249622 A1* | 9/2015 | Phillips | H04L 65/4084 |
| | | | 709/219 |

\* cited by examiner

```
<manifest>                509
    <collection>  ◄                     503
        <name="2014 Website Revamp"/>  ◄
        <time_of_creation="2014-01-01"/>
        <folder="X:\Projects\14wr"/>
     <authorized_users>
        <user="John Smith"/>
        <user="Susan Johnson"/>
     </authorized_users>           506
     <documents>                              239a
        <document>
            <name="Project Constraints"/>
            <location="X:\Projects\14wr\projectconstraints.doc"/>
        </document>                                    239b
        <document>
            <name="Wireframes for Website"/>
            <location="http://site.co/imgs/wireframes_v1.jpg"/>
        </document>
     </document>          239c
     <conversations>
        <conversation>  ◄
            <location="X:\Projects\14wr\chatlog091248.doc"/>
            ...      239d
        </conversation>
        <conversation>  ◄
            <location="X:\Projects\14wr\screen_capture.jpg"/>
            ...
        </conversation>
        </conversation>
     </collection> ◄                                       115a
     <collection>    512
        ...
     </collection>  ◄
                    115b                                      230
     ...
</manifest>
```

FIG. 5

SECURE CONVERSATION AND DOCUMENT BINDER

CROSS-REFERENCE TO RELATED APPLICATIONS

Benefit is claimed under 35 U.S.C. 119(a)-(d) to Foreign application Serial No. 6851/CHE/2014 filed in India entitled "SECURE CONVERSATION AND DOCUMENT BINDER", on Dec. 31, 2014, by AIRWATCH LLC, which is herein incorporated in its entirety by reference for all purposes

BACKGROUND

In an enterprise setting, it is common for a user to create a document, store the document in a file repository, and send the document or a link to the document to colleagues for group collaboration. Some colleagues may open the document and annotate the document with their comments. Other colleagues may provide feedback by email, instant messaging, or some other form of communication. Decisions and changes to the document may be made as a result of those conversations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is an example of a manifest according to various embodiments of the present disclosure.

DETAILED DESCRIPTION

Figure 1:
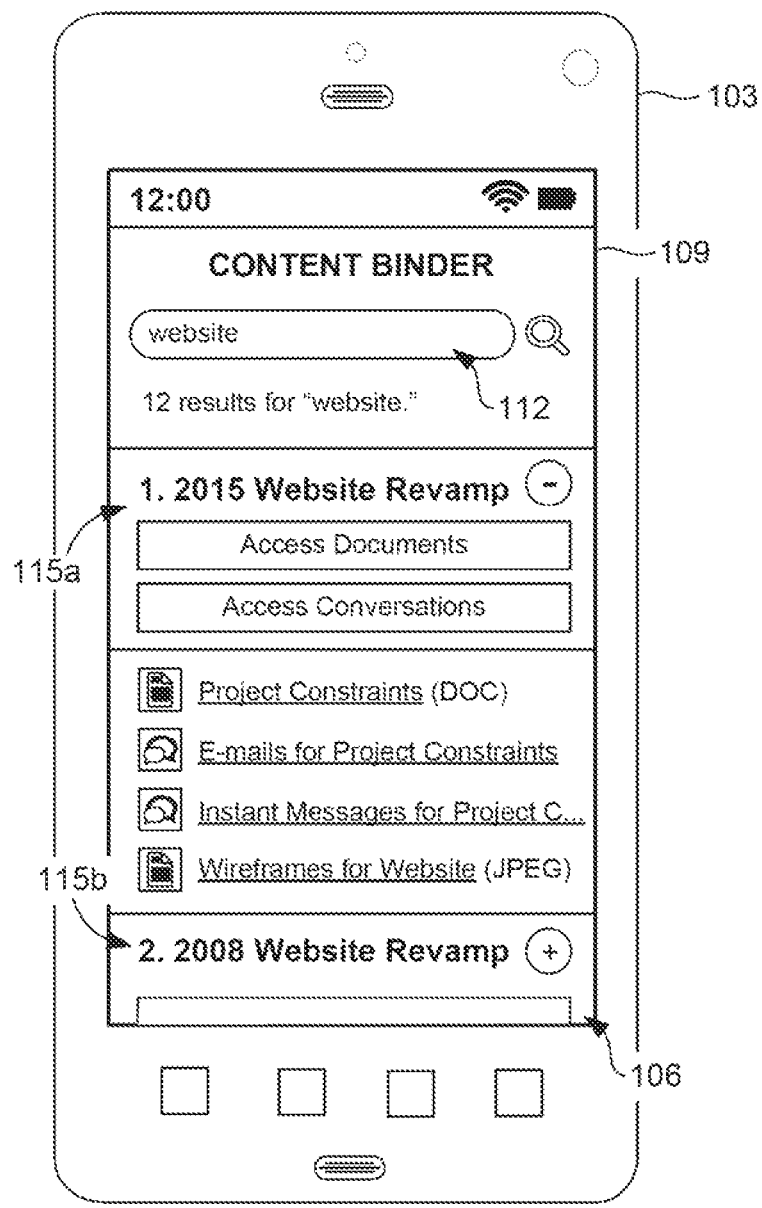
FIG. 1 is a drawing of a user interface for a client application rendered on a client device according to various embodiments of the present disclosure.

The present disclosure relates to maintaining a collection of documents and conversations associated with those documents according to predefined configurations such that the collection of documents and conversations can be accessed in a secure and manageable manner. As discussed above, in an enterprise setting, it is common for a user to create a document, store the document in a file repository, and send the document or a link to the document to colleagues for group collaboration. Some colleagues may open the document and annotate it with their comments. Other colleagues may provide feedback by email, instant messaging, or some other form of communication. Decisions and changes to the document may be made as a result of those conversations. However, these conversations could employ different applications hosted on a variety of servers or executed on a client device itself. For example, these conversations may be stored on a third-party email server having undesirable email retention policies. In the future, the user or a colleague may desire to know what conversations took place in association with the document or project and what conversations resulted in a particular change to the documents. However, the emails, instant messages, and annotated comments may have been lost or deleted. Further, an enterprise and/or its users may wish to secure the document and the conversations that took place.

According to various embodiments described herein, an application may manage importation of documents, as well as conversations that pertain to those documents, into a collection (also referred to as a "binder") according to one or more predefined storage policies. The collection may be associated with a user-defined subject, such as a project name, a group, a category, etc., and may be automatically populated with content. The collection may also be shared with authorized users according to predefined criteria. For example, one or more collaborators may create a collection of files for a collaborative project, and the one or more collaborators, collectively or independently, may import files, such as documents and conversations (e.g., email or instant messages), into the collection. The collaborators may establish predefined criteria that provides access to or a sharing of the collection with other authorized users. The application, as will be described herein, provides importation of one or more conversations into the collection such that the conversation is associated with corresponding files, thereby facilitating a future retrieval of the conversations associated with those documents.

Further, the application may generate and/or maintain a manifest for the collection that contains information associated with the files stored in the collection. For example, the manifest may provide information relating to relationships between the documents and conversations, as well as other information. To this end, conversations held regarding a particular document may be associated with that document, as well as any revisions made as a result of those conversations. According to various embodiments described herein, a manifest for a collection may comprise an extensible markup language (XML) document having a location reference to each of the documents and conversations in the collection. A location reference may comprise a pointer, a memory address, a file path, a uniform resource locator (URL), etc., that enables access to a corresponding document or conversations. When generating a user interface for a client application, the manifest may be employed to generate user interface data.

As shown in the example scenario of FIG. 1, a client device 103 may comprise a smartphone, a mobile device, or any other computing device. A client application executable in the client device 103 may generate a user interface 106 rendered in a display 109 of the client device 103. In the example scenario of FIG. 1, the client application provides access to one or more collections. A user of the client device 103 may perform a search using a search component 112 such that one or more collections 115a . . . 115b (referred to herein collectively as collections 115) associated with the term "website" are shown in the user interface 106. For example, a search with the term "website" may return one or more collections 115 with a title or description containing the term "website."

As discussed above, the client application manages importation of files into a collection 115. According to various embodiments, the files may include documents (e.g., word processing documents, spreadsheets, presentations), conversations (e.g., emails, instant messages, and annotated comments), media content (e.g., music, pictures, and video), or other files. At least a portion of the files for a particular collection 115 may be shown in association with the collection 115. In the example of FIG. 1, the collection 115 entitled "2015 Website Revamp" may be a collaborative project to revamp a website. The collection 115 may comprise one or more documents referred to in FIG. 1 as "Project Constraints" and "Wireframes for Website," shown in the user interface 106 below the title of the collection 115 or in any other suitable arrangement. Similarly, the collection 115 may comprise one or more conversations referred to in FIG. 1 as "E-mails for Project Constraints" and "Instant Messages for Project Constraints."

The documents and the conversations shown in the client application 103 of FIG. 1 may have been imported into the collection 115 and stored according to at least one storage policy to facilitate the future retrieval of the documents and conversations. For example, for archival purposes, the emails may be exported from an email application and stored in association with the collection 115 in at least one data store. When a user selects a document or conversation, the corresponding document or conversation may be accessed (assuming the requesting user is authorized) by an appropriate application on the client device 103. For example, by selecting a link or a virtual button associated with "Project Constraints," a word processing application may be launched to display the corresponding document file. Similarly, by selecting a link or a virtual button associated with "Wireframes from Website," an image viewing application may be launched to display the corresponding JPEG file.

Figure 2:
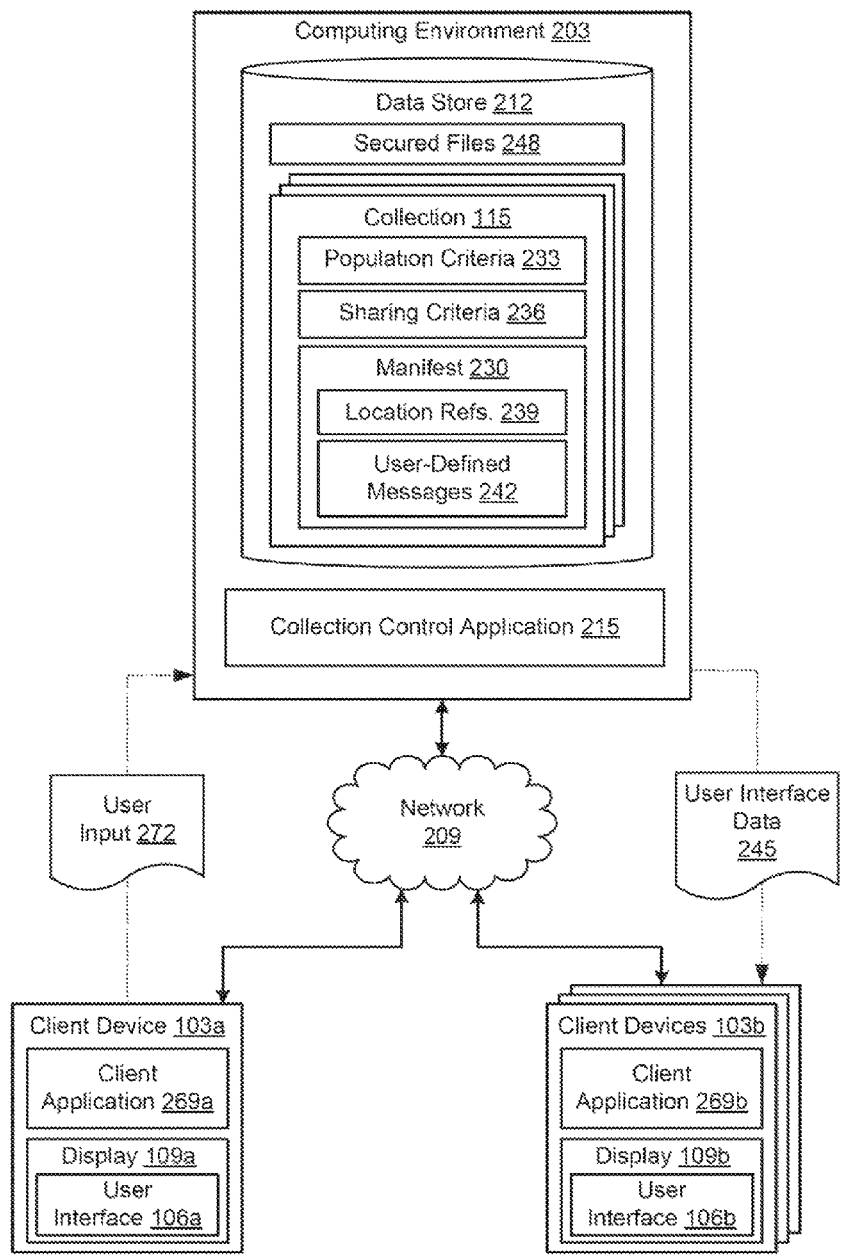
FIG. 2 is a drawing of a networked environment according to various embodiments of the present disclosure.

With reference to FIG. 2, shown is a networked environment 200 according to various embodiments. The networked environment 200 includes a computing environment 203, a client device 103a, and a plurality of other client devices 103b, which are in data communication with each other over a network 209. The network 209 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks. In the depicted example of FIG. 2, the client device 103a and the other client devices 103b are shown merely for illustrative purposes to describe how embodiments of the disclosure may operate. It should be appreciated that the illustrated devices can be deployed in various ways and that the depicted illustration is non-limiting.

The computing environment 203 may comprise, for example, a server computer or any other system providing computing capability. Alternatively, the computing environment 203 may comprise a plurality of computing devices that are arranged, for example, in one or more server banks or computer banks or other arrangements. For example, the computing environments 203 may comprise a grid computing resource and/or any other distributed computing arrangement. Such computing devices may be located in a single installation or may be distributed among many different geographical locations. For purposes of convenience, the computing environment 203 is referred to herein in the singular. Even though the computing environment 203 is referred to in the singular, it is understood that a plurality of computing environments 203 may be employed in the various arrangements as described above.

Various applications and/or other functionality may be executed in the computing environment 203 according to various embodiments. Also, various data is stored in a data store 212 that is accessible to the computing environment 203. The data store 212 may comprise memory of the computing environment 203, mass storage resources of the computing environment 203, or any other storage resources on which data may be stored by the computing environment 203. The data store 212 may also be representative of a plurality of data stores 212 as can be appreciated. The data stored in the data store 212, for example, is associated with the operation of the various applications and/or functional entities described below.

The components executed by the computing environment 203, for example, include a collection control application 215 and other applications, services, processes, systems, engines, or functionality not discussed in detail herein. The collection control application 215 is executed to provide the storage of files, documents, and conversations on behalf of one or more users, an enterprise or organizational storage account, or any other entity. The collection control application 215 also provides encryption and security of the files that are stored within the computing environment 203.

The data stored in the data store 212 includes, for example, data for one or more collections 115 and potentially other data. A collection 115 can include data associated with a user or an account associated with an organization or entity. Further, data for the one or more collections 115 can include information about files that are stored on behalf of a user or organization within the computing environment 203. This information for a particular collection 115 may be maintained in a relational database, such as a structured query language (SQL) database, or may be maintained in a single file, such as a comma separated file (CSV) or a manifest 230. Data for one or more collections 115 can also include other data and information that facilitates access to files that are stored within the computing environment 203. For example, the data for one or more collections 115 can also include access settings, such as authentication credentials, delegation settings (e.g., information about other users who may be provided access to the files of a particular user or organization), synchronization settings, user or organizational profile information, population criteria 233, sharing criteria 236, or any other forms of user data.

As noted above, the collection control application 215 is operable to generate and/or maintain a manifest 230 for a collection 115 that provides access to the files, such as documents and conversations, stored in association with the collection 115. The manifest 230 may comprise information pertaining to relationships among the files. For example, conversations held regarding a particular document may be associated with that document, as well as any revisions made as a result of those conversations. According to various embodiments described herein, a manifest 230 for a collection 115 may comprise an XML document having location references 239 to each of the documents and conversations in the collection 115. A location reference 239 in the manifest 230 may comprise a pointer, a memory address, a file path, a URL, etc., that provides access to a corresponding document or conversations. In various embodiments, the location reference 239 may include one or more references to external file repositories (e.g., network drives) and/or locally stored files. Additionally, the manifest 230 may store user-defined messages 242 from one or more conversations in the manifest 230 (e.g., inline), as opposed to having a location reference 239 for the conversation. When generating a user interface 106 for a client application, the manifest 230 may be employed to generate user interface data 245.

The data store 212 may further comprise one or more secured files 248 that represent documents, media, user-defined messages 242, or any other data that can be stored in a file system or storage accessible to the computing environment 203. In various embodiments, the secured files 248 may comprise files uploaded over the network 209 or otherwise provided by a user of the client device 103a. A security key may be used to encrypt or protect a file as a secured file 248 and can represent a password, encryption key, or any other data that can be used to generate an encrypted or secured version of a particular file.

The client device 103a and the other client devices 103b (referred to herein collectively as client devices 103) are representative of one or more computing devices that may be associated with a user or organization. The client device 103a may be associated with a particular collection 115 stored within the computing environment 203 and made accessible to the client device 103 through the collection control application 215. Individual ones of the client devices 103 may comprise, for example, a processor-based system, such as a computer system, that may be embodied in the form of a desktop computer, a laptop computer, a personal digital assistant, a cellular telephone, a smartphone, a set-top box, a music player, a tablet computer system, a game console, an electronic book reader, or any other device with like capability. The client devices 103 may include displays 109a . . . 109b (referred to herein collectively as displays 109) that comprise, for example, one or more devices such as liquid crystal display (LCD) displays or other types of display devices. The client devices 103 may also be equipped with networking capability or networking interfaces, including a localized networking or communication capability, such as an NFC capability, RFID read and/or write capability, a microphone and/or speaker, or other localized communication capability.

The client devices 103 may be configured to execute various applications, such as client applications 269a . . . 269b (referred to herein collectively as client applications 269). In various embodiments, a client application 269 is executed to obtain user input 272 from a user in association with a collection 115. In various embodiments, the user input 272 may comprise, for example, population criteria 233 and sharing criteria 236, or the user input 272 may comprise a selection of one or more files to upload to the computing environment 203. For example, a user of the client device 103a may provide one or more documents, user-defined messages 242, or other data, to import into a collection 115. Using the client application 269, the user may establish population criteria 233 for the collection 115 that, when satisfied, causes a file, document, or user-defined message 242 to automatically be added to the collection 115. In various embodiments, the population criteria 233 may be set by an administrator and pushed to a client device 103a for local enforcement. Similarly, the user may establish sharing criteria 236 for the collection 115 that, when satisfied by at least one of the other client devices 103b, makes the collection 115 accessible to the other client devices 103b that comply with the sharing criteria 236. In some embodiments, the functionality described herein as a part of the client application 269 can be split up into multiple applications or invoked by application programming interface (API) calls.

Next, a general description of the operation of the various components of the networked environment 200 is provided. To begin, the collection control application 215 manages importation of files received as user input 272 from the client device 103a into a collection 115 (also referred to as a "binder") according to one or more predefined storage policies. In various embodiments, the files may include documents, media content, conversations, etc. The conversations may be made up of individual user-defined messages 242 or a combination of multiple user-defined messages 242. The collection 115 may be associated with a user-defined subject, such as a project name, a group, a label, a category, etc., and may be automatically populated with content according to population criteria 233 established by a user of the client device 103. In various embodiments, the population criteria 233 may be established by an administrator and be pushed to a client device 103a for local enforcement by the client application 269. As a result, the population criteria 233 may direct the client device 103a to not collect data if the client device 103a does not comply with a compliance policy set forth in the population criteria 233. For example, if the client device 103a has been rooted, jail-broken, or is connected to an insecure network, the client application 269 may not collect or communicate data over the network 209. In addition, the collection 115, and the files contained therein, may be made accessible over the network 209 by a unique URL or may be made accessible by the client application 269. The user may establish sharing criteria 236, received as user input 272, that causes an automatic sharing of the collection 115 with the other client devices 103b according to the sharing criteria 236.

For example, one or more collaborators may create a collection 115 for a collaborative project and the one or more collaborators, collectively or independently, may import files and documents into the collection 115. The collection control application 215 stores the imported files and documents in a secured format as secured files 248 in the data store 212. Additionally, the collection control application 215 may create or update a relational database associated with the collection 115 to reflect the upload, removal, or modification of the secured files 248. Alternatively, the collection control application 215 may generate and/or maintain a manifest 230 for the collection 115 that reflects the upload, removal, or modification of the secured files 248, as well as location references 239 that assist the client application 269 in accessing the secured files 248. In some embodiments, the secured files 248 may be stored locally on the client devices 103. Accordingly, the control collection application 215 can be configured to identify changes to the secured files 248 and may update the data store 212 to reflect those changes. Further, the control collection application 215 may be configured to maintain one or more versions of a secured file 248 such that the data store 212 has a secured file 248 for each of the one or more versions.

In various embodiments, a user of the client device 103a (or an administrator) may establish retention criteria for the client device 103a. For example, in the event that certain insecure states of the device are detected, access to a collection 115 may be temporarily or permanently disabled. Disabling access to the collection 115 may include, for example, locking the client device 103a or predefined features of the client device 103a, performing a backup and/or wipe of the client device 103a, resetting a user personal identification number (PIN), etc. Retention criteria may be specific to a collection 115, such that a sharing of the collection 115 causes enforcement of the retention criteria on an entire population of client devices 103 to which have access to the collection 115. For example, if a first client device 103 ("Device A") is jail-broken (or does not comply with one or more compliance rules), a second client device 103 ("Device B") may not access the collection 115. In various embodiments, Device B may receive a notification regarding Device A causing incompliance, and a user of Device B may remove Device A from a sharing group to regain access to the collection 115.

According to various embodiments described herein, the collection control application 215 generates a manifest 230 for a collection 115 that comprises an XML document having respective location references 239 for of the secured files 248 in the collection 115. A location reference 239 may comprise a pointer, a memory address, a file path, a URL, etc., that enables access to a corresponding document or user-defined message 242. When generating a user interface 106 for a client application 269, the manifest 230 is employed by the control collection application 215 and/or the client application 269 to generate user interface data 245. For example, the manifest 230, comprising one or more location references 239, may be used to generate the user interface 106 of FIG. 1. In the example of FIG. 1, buttons, hyperlinks, or other user interface components may be generated that, when manipulated by the user, cause the client device 103 to access a resource corresponding to a manipulated one of the location references 239.

Figure 3A:
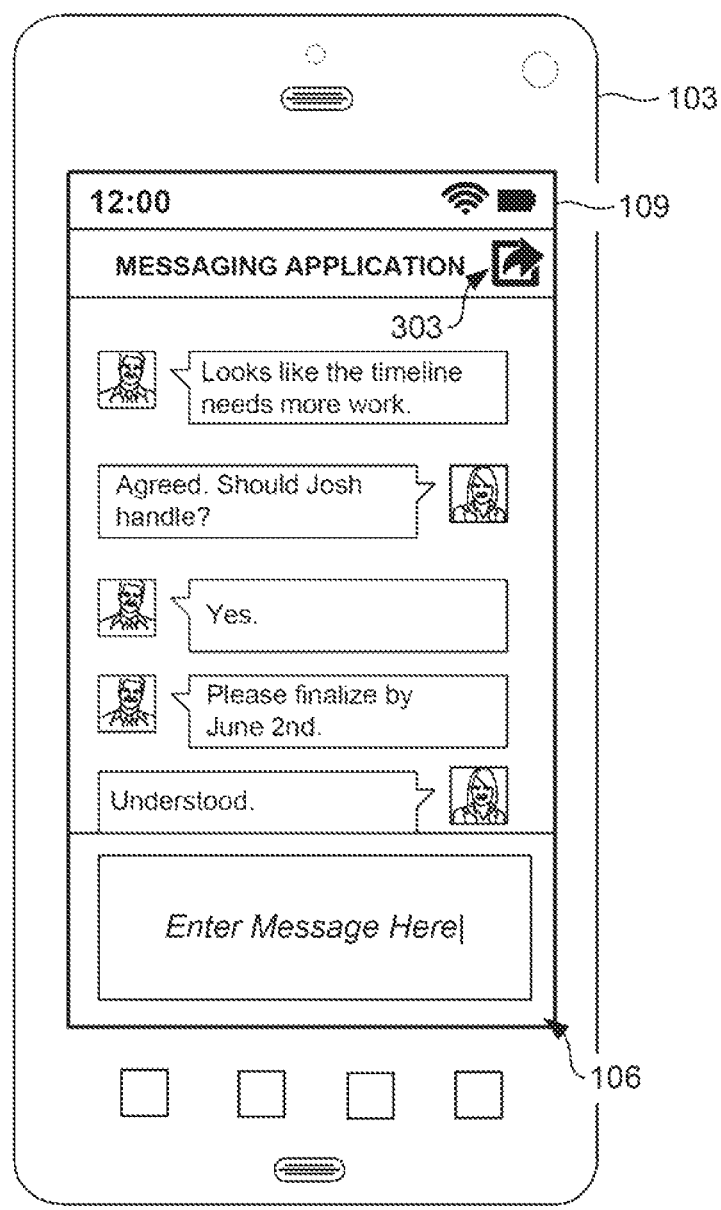
FIGS. 3A-3B are drawings of user interfaces for a client application rendered on a client device according to various embodiments of the present disclosure.

Referring next to FIG. 3A, a scenario is shown where a messaging application is executed on the client device 103. The messaging application generates a user interface 106 for rendering in the display 109 of the client device 103 to manage a conversation or an exchange of media (e.g., text, audio, video, photos) between two or more users. According to various embodiments, the messaging application may comprise an instant messaging application, a simple message service (SMS) messaging application, an email application, or a similar application. For example, a first user may generate a message and cause the message to be sent to a second user who may respond with his or her own message.

In various circumstances, the messaging application may be used to collaborate on a collection 115. For example, a conversation may take place between two or more collaborators regarding a particular project, document, etc. Conventionally, data associated with the conversation may be retained in a local data store of the client devices 103 participating in the conversation, or the data may be retained on a server computing device. Accordingly, retention of the data associated with the conversation is subject to owners of the client device 103 or an operator of the server computing device. As storage on the client device 103 is usually unreliable (e.g., the client devices 103 are subject to damage, frequent replacement, and reformatting), and because server computing devices traditionally employ retention policies where conversations older than a predefined period of time are automatically removed, it may be beneficial to export the conversation to a collection 115 to assist with retention and future retrieval of the conversations.

Figure 3B:
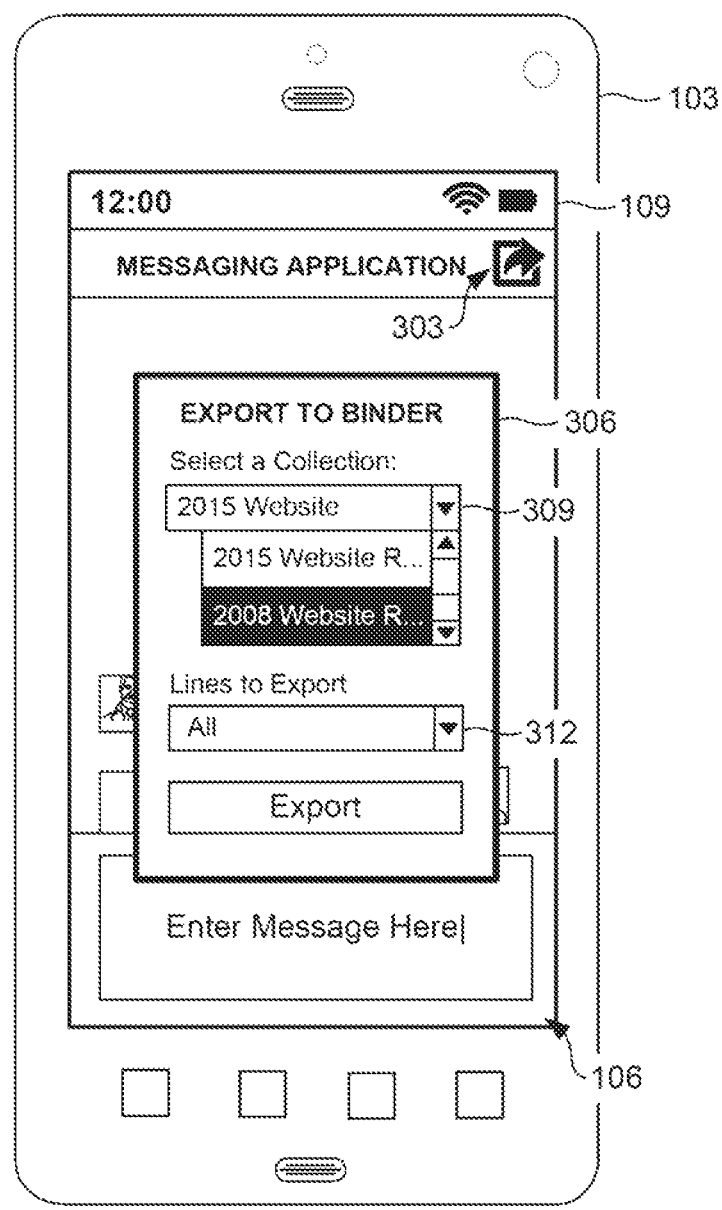

To this end, a user of the client device 103 may manipulate an export component 303 to start an export process where all or a portion of the conversation is imported into a collection 115 identified by the user. The export component 303 may comprise a virtual button, icon, or other user interface component. In the example of FIG. 3B, a dialog 306 is rendered in the user interface 106 in response to a manipulation of the export component 303. In various embodiments, the dialog 306 provides a user with the ability to store the conversation in association with one or more collections (e.g., "2015 Website Revamp" or "2008 Website Revamp") using a collection selection component 309 rendered in the user interface 106. Further, the dialog 306 may provide for a creation of new collections 115.

In some embodiments, a line selection component 312 may be utilized to select all or a portion of the conversation for importation into a selected one or more of the collections 115. The user-defined messages 242 that took place between a start point and an end point will be subject to importation into the selected one or more of the collections 115. In other embodiments, a time selection component (not shown) may be utilized to select all or a portion of the conversation based on a start time and an end time for importation into a selected one or more of the collections 115. The user-defined messages 242 that took place between the start time and the end time will be subject to importation into the selected one or more of the collections 115.

In some embodiments, the messaging application of FIGS. 3A-B may be developed and operated by an entity separate from an entity managing the collection control application 215. Accordingly, the export component 303 may be implemented using a software development kit (SDK) that permits third-party developers to include the export component 303 as a feature of their proprietary applications. In various embodiments, the export component 303 may be made accessible to one or more applications by an operating system of the client device 103 in response to an installation of the client application 269. For example, various operating systems may have a native share application programming interface (API) such that, when a share component or button is manipulated, all applications capable of sharing content are listed in a dialog for selection. In other embodiments, the export component 303 may be made accessible to one or more applications as a plug-in, such as a web browser application plug-in.

Figure 4:
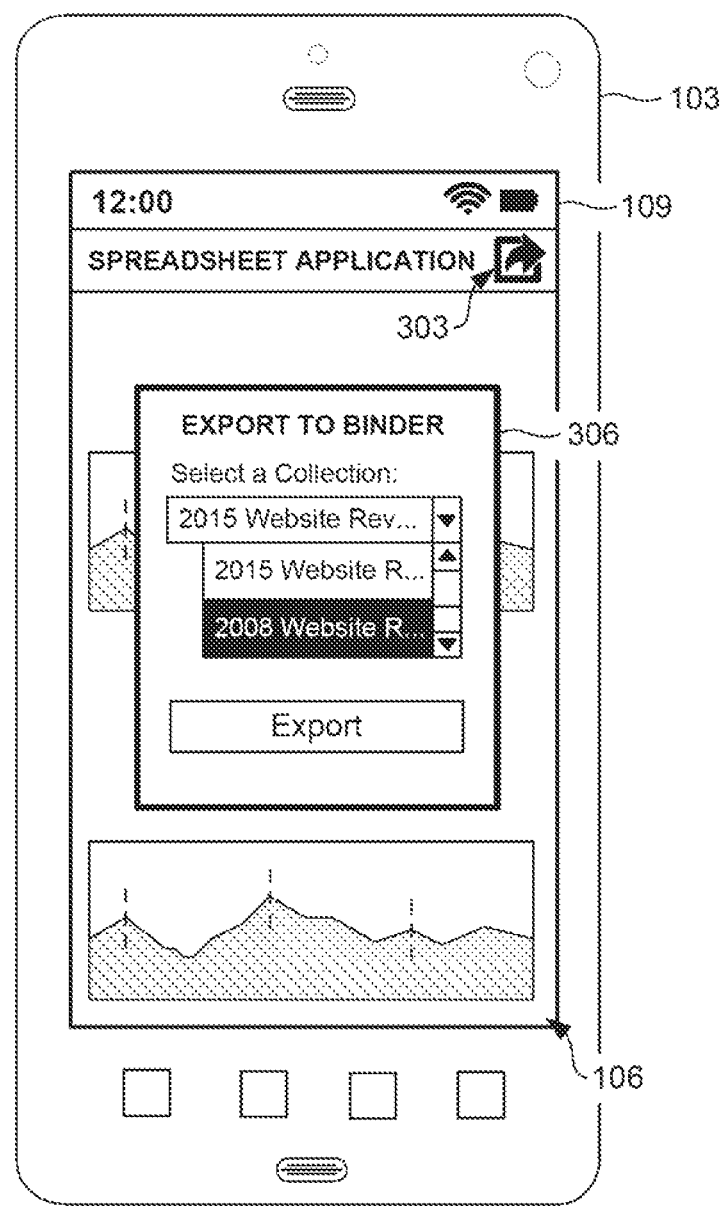
FIG. 4 is a drawing of a user interface for a client application rendered on a client device according to various embodiments of the present disclosure.

Moving on to FIG. 4, a scenario is shown where a spreadsheet application is executed on the client device 103. The spreadsheet application generates a user interface 106 for rendering in the display 109 of the client device 103 to facilitate viewing of a spreadsheet document, as may be appreciated. Similar to the messaging application embodiments of FIGS. 3A-B, a user of the client device 103 may manipulate an export component 303 of the spreadsheet application to start an export process where all or a portion of the document is imported into a collection 115 identified by the user. For example, a dialog 306 is rendered in the user interface 106 of FIG. 4 in response to a manipulation of the export component 303 that provides the user with the ability to store the spreadsheet document in association with one or more collections (e.g., "2015 Website Revamp" or "2008 Website Revamp") using a collection selection component 309 (FIG. 3B) rendered in the user interface 106. Although the client application 269 executable on the client device 103 in FIG. 4 includes a spreadsheet application, other types of applications may cause an export of a document or file to a collection 115. For example, the client application 269 may include a word processing application, an image editing application, or any other suitable application.

Although the embodiments of FIGS. 3A-B and FIG. 4 depict using the export component 303 to export a conversation or a document after the conversation has been conducted or after the document is created, in other embodiments, a collection 115 may be selected by a user before a conversation is started or before a document is created in the client application 269. The conversation or document may be associated with the collection 115 selected by the user at its inception and stored according to the storage policy of the collection 115. To this end, the document or conversation may be transmitted from the client device 103 to the computing environment 203 periodically or upon termination of an application session (e.g., when a user saves a file and closes out of an application). In another embodiment, a timer component (not shown) may be toggled by a user to generate a start time and an end time as a conversation progresses. Any conversation that takes place between the toggling of the timer component will be subsequently (or in real-time) associated with the collection 115 and stored according to the storage policy of the collection 115. In some embodiments, assuming all or a portion of a particular conversation has been associated with a collection 115, any subsequent communications in the conversation may be added to the collection 115 automatically.

Further, an export of the conversation of FIGS. 3A-B may be performed by generating a conversation log or chat log, taking one or more screen captures of the messaging application comprising one or more messages, extracting the text for storage inline in a document, and/or identifying user-defined messages 242 in metadata of a previously existing file. For example, assuming a word processing document has comments annotated in the margins, the word processing document may be processed to identify those comments annotated in the margins while filtering out the substance of the document itself.

Referring next to FIG. 5, shown is an example of a manifest 230 that maintains information associated with a collection 115 and may be used to generate a user interface 106 (FIG. 1) according to various embodiments of the present disclosure. The manifest 230 of FIG. 5 comprises an XML representation of data although it should be appreciated that in some embodiments other representations may be employed including JAVASCRIPT® object notation (JSON), standard generalized markup language (SGML), hypertext markup language (HTML), or any other suitable data representation. In various embodiments, the manifest 230 is created and/or maintained for a collection 115 by the collection control application 215. In other embodiments, the manifest 230 is created and/or maintained by the client device 103. In some embodiments, the manifest 230 is created and/or maintained by a combination of the collection control application 215 and the client application 269.

According to various embodiments, the manifest 230 comprises collection data 503, user data 506, and/or other data. Further, the manifest 230 may comprise location references 239a . . . 239d (collectively location references 239) to files, documents, and conversations. A location reference 239 for a particular resource (e.g., file, document, or conversation) may include a memory address, a file path, a URL, or any other identifier that identifies where to access to a corresponding document or conversation. In various embodiments, the location reference 239 may include one or more references to external file repositories (e.g., network drives) and/or locally stored files.

Data associated with various documents and conversations are shown within a start tag 509 ("<collection>") and an end tag 512 ("</collection") for the first one of the collections 115a. For example, data associated with a particular document is shown within document tags ("<document> . . . </document>") and data associated with a particular conversation or user-defined message 242 (FIG. 2) is shown within conversation tags ("<conversation> . . . </conversations>"). Consequently, the manifest 230 comprises a hierarchical arrangement of information associated with each of the collections 115a . . . 115b (collectively collections 115). Additionally, the nested arrangement of the information in the hierarchy of the manifest 230 may provide an indication that the user-defined messages 242 are associated with a particular file or document or are associated with a particular collection 115. For example, if conversation tags ("<conversation> . . . </conversations>") are included within document tags (e.g., "<document> . . . <conversation> . . . </conversations> . . . </document>"), it may be assumed that the conversation pertains to that document. When generating a user interface 106 for a client application 269, the manifest 230 is employed to generate user interface data 245, such as HTML code for a network page.

As noted above, the data associated with conversations or user-defined messages 242 shown in FIG. 5 include location references 239 to files, such as a document of a chat log (e.g., "chatlog091248.doc") or a digital image screen capture (e.g., "screen_capture.jpg"). In various embodiments, the conversation itself may be stored inline within the XML document. For example, the first message shown in FIG. 3A states, "Looks like the timeline needs more work." Referring back to FIG. 5, this user-defined message 242 may be stored inline within a conversation start tag and a conversation end tag, as shown below:

<conversation><message="Looks like the timeline needs more work."></conversation>.

Each user-defined message 242 made by a user may have its own entry in the manifest 230. Additionally, information associated with the user-defined message 242 may be set forth between the conversation start tag and the conversation end tag, such as a time and date the user-defined message 242 was created, sent, and/or received; a reference to a document or a particular portion of a document in the collection 115; etc. In addition, other tags, such as those created and/or defined by a user or an administrator may be tagged in association with a particular document, file, conversation, etc.

Figure 6:
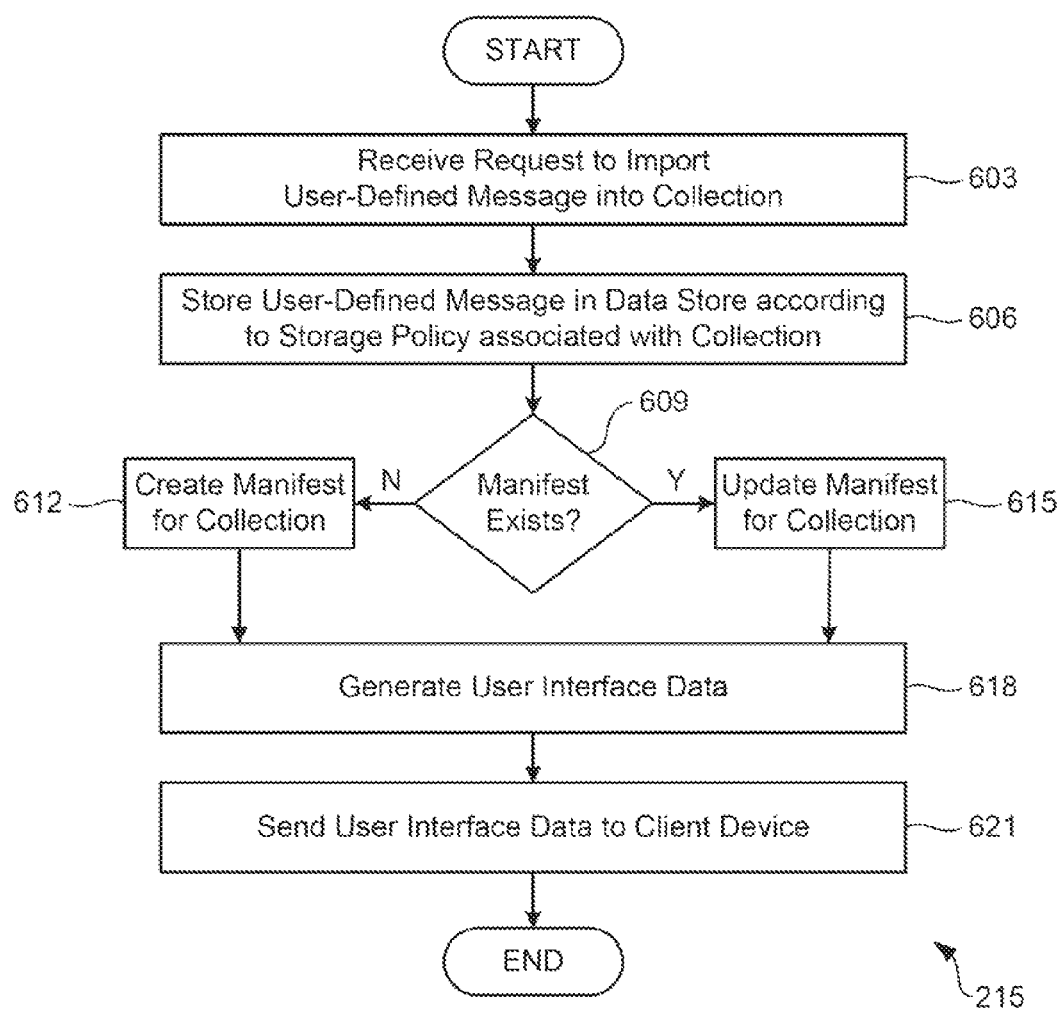
FIG. 6 is a flowchart illustrating an example of functionality implemented by components executed in the networked environment of FIG. 2 according to various embodiments of the present disclosure.

Referring next to FIG. 6, shown is a flowchart that provides one example of the operation of a portion of the collection control application 215 according to various embodiments. It is understood that the flowchart of FIG. 6 provides merely an example of the many different types of functional arrangements that may be employed to implement the operation of the portion of the collection control application 215 as described herein. As an alternative, the flowchart of FIG. 6 may be viewed as depicting an example of elements of a method implemented in the computing environment 203 (FIG. 2) according to one or more embodiments. Functionality attributed to the collection control application 215 can be implemented in a single process or application executed by the client device 103 and/or multiple processes or applications. The separation or segmentation of functionality as discussed herein is presented for illustrative purposes only.

Beginning with 603, a request to import a user-defined message 242 into a collection 115 is received by the computing environment 203 from a client device 103 (FIG. 1). In various embodiments, the user-defined message 242 may comprise all or a selected portion of an email, an instant message conversation, annotated comments made in a document, etc. In some embodiments, the request may be initiated in response to a manipulation of the export component 303 (FIGS. 3A-B) in the user interface 106 (FIG. 1).

In 606, the user-defined message 242 may be stored in the data store 212 according to one or more message storage policies associated with the collection 115. A message storage policy may include a destination where the user-defined message 242 should be stored, such as a network drive, a folder, a memory address, etc. Further, the message storage policy may specify an encryption of the user-defined message 242 prior to storage. The message storage policy may also include a retention policy that sets forth a period of time after which the user-defined message 242 should be removed from the data store 212 and/or from the client device 103. Moving on to 609, it is determined whether a manifest 230 exists for the collection 115. If the manifest 230 does not exist for the collection 115, in 612, a manifest 230 is created for the collection 115. Alternatively, in 615, if the manifest 230 exists for the collection 115, the manifest 230 is updated to reflect the importation of the user-defined message 242 into the collection 115.

In various embodiments, the manifest 230 may associate the user-defined message 242 with a document or file in the collection 115. For example, a reference to the user-defined message 242 may be set forth within document tags ("<document> . . . </document>") for the document or file in the manifest 230. In others embodiments, the manifest 230 may set forth an association between the user-defined message 242 with at least one document or file in the collection 115. In this embodiment, a reference to the user-defined message 242 may be set forth within the collection tags ("<collection> . . . </collection>"), as opposed to the documents tags. The hierarchical arrangement of the XML document may indicate the associations between the user-defined message 242 and the files or documents in the collection 115.

According to various embodiments, the manifest 230 may comprise a location reference for individual ones of the files or documents in the collection 115 as well as a location reference for individual ones of the user-defined messages 242. A location reference may comprise a pointer, a memory address, a file path, a URL, etc., that enables access to a corresponding document or conversations.

In 618, user interface data 245 may be generated utilizing the manifest 230. The user interface data 245 may comprise information used in rendering a user interface 106, such as the user interface 106 of FIG. 1. In various embodiments, the user interface data 245 may comprise HTML code for a network page. In other embodiments, the user interface data 245 may comprise information that populates user interface components used by an operating system of the client device 103. In 621, the user interface data 245 is sent to the client device 103 for rendering in a display 109 (FIG. 1). For example, the manifest 230, comprising one or more location references 239, may be used to generate the user interface 106 of FIG. 1. In the example of FIG. 1, buttons, hyperlinks, or other user interface components may be generated that, when manipulated by the user, cause the client device 103 to access a resource corresponding to a manipulated one of the location references 239. Thereafter, the process proceeds to completion.

Figure 7:
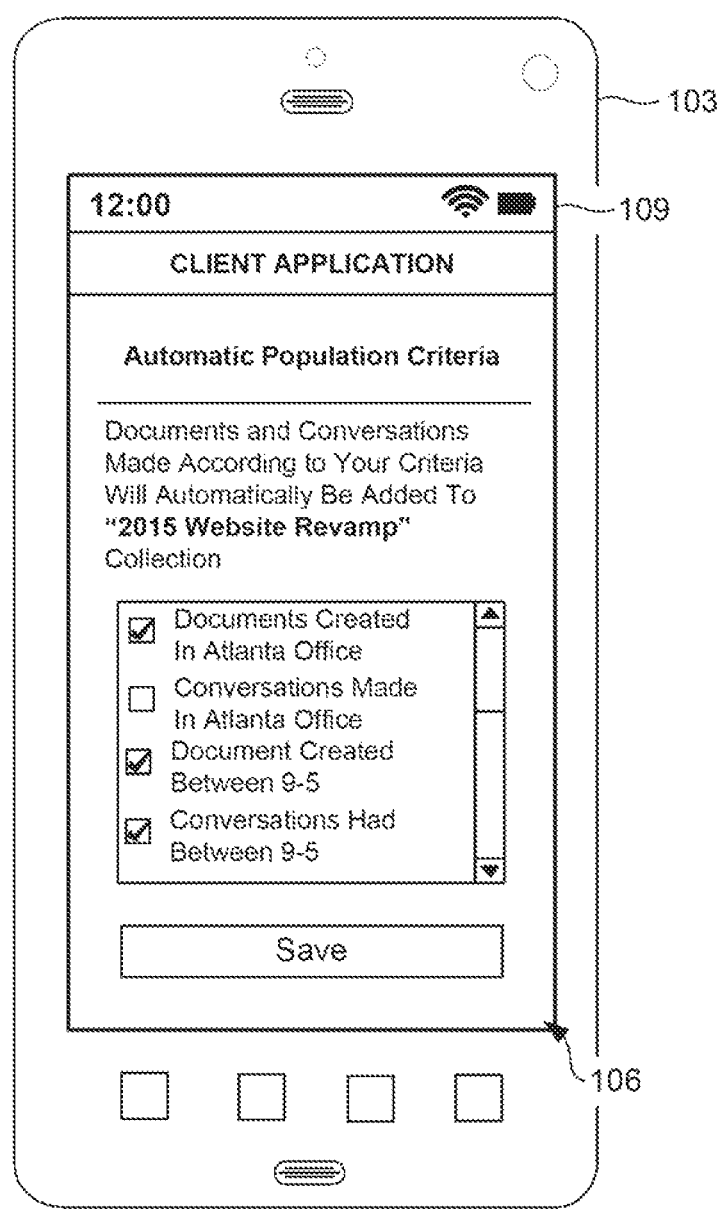
FIG. 7 is a drawing of a user interface for a client application rendered on a client device according to various embodiments of the present disclosure.

Moving on to FIG. 7, another scenario is shown where a client application 269 (FIG. 2) is executed on the client device 103. According to various embodiments described herein, one or more documents and/or user-defined messages 242 (FIG. 2) may be imported automatically into a collection 115 (FIG. 1). To this end, a user of the client device 103 may establish population criteria 233 (FIG. 2) that, when satisfied, automatically populates the collection 115 by importing a document and/or a user-defined message 242 into the collection 115. For example, a user may want all documents created between 9:00 AM and 5:00 PM (e.g., standard business hours) imported into a collection 115. Similarly, the user may want all conversations made while located in a particular location, such as when the user is in a particular building or office, to be imported into the collection 115. Geo-location of the client device 103 may be employed to identify whether the user is in the particular location and, if so, any conversations made while in that location will be imported into the collection 115 automatically without user intervention. In various embodiments, a user may create a local compliance rule such that the client device 103 determines whether the user is at a location defined by the user and, if so, any conversations made while in the location are imported into the collection 115 automatically. In other embodiments, a user interface component (not shown) may be toggled by a user to generate a start time and an end time as a conversation progresses. Any conversation that takes place between the toggling of the user interface component may be subsequently (or in real-time) imported into the collection 115.

The client application 269 generates a user interface 106 for rendering in the display 109 of the client device 103 to enable a definition of the population criteria 233. Similar to the messaging application embodiments of FIGS. 3A-B, a user of the client device 103 may manipulate an export component 303 of the spreadsheet application to start an export process where all or a portion of the document is imported into a collection 115 identified by the user according to the population criteria 233.

Figure 8:
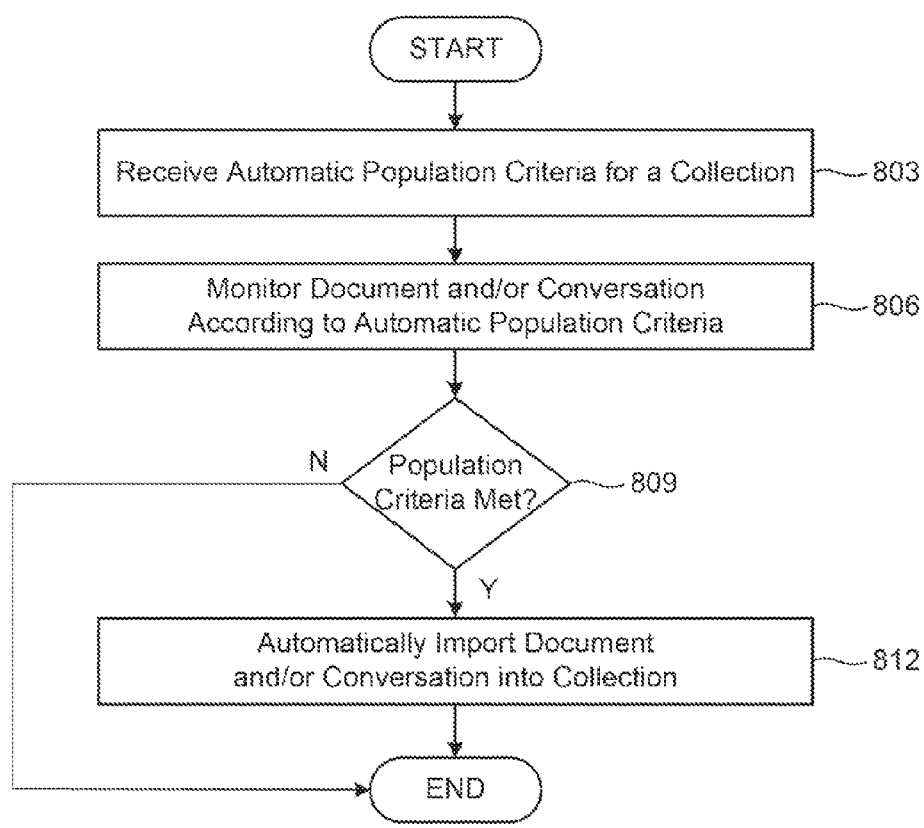
FIG. 8 is a flowchart illustrating an example of functionality implemented by components executed in the networked environment of FIG. 2 according to various embodiments of the present disclosure.

Referring next to FIG. 8, shown is a flowchart that provides one example of the operation of a portion of the collection control application 215 according to various embodiments. It is understood that the flowchart of FIG. 8 provides merely an example of the many different types of functional arrangements that may be employed to implement the operation of the portion of the collection control application 215 as described herein. As an alternative, the flowchart of FIG. 8 may be viewed as depicting an example of elements of a method implemented in the computing environment 203 (FIG. 2) according to one or more embodiments. Functionality attributed to the collection control application 215 can be implemented in a single process or application executed by the client device 103 (FIG. 1) and/or multiple processes or applications. The separation or segmentation of functionality as discussed herein is presented for illustrative purposes only.

As noted above, one or more documents and/or user-defined messages 242 (FIG. 2) may be imported automatically into a collection 115 according to population criteria 233 (FIG. 2). To this end, a user of the client device 103 may establish population criteria 233 that, when satisfied, automatically populates the collection 115 by importing a document and/or a user-defined message into the collection 115. For example, a user may want all conversations made while located in a particular location, such as when the user is in a particular building or office, to be imported into the collection 115. Geo-location of the client device 103 may be employed to identify whether the user is in the particular location and, if so, any conversations made while in that location will be imported into the collection 115 automatically without user intervention. In various embodiments, a user may create a local policy such that the client device 103 determines whether the user is at a location defined by the user and, if so, any conversations made while in the location are imported into the collection 115 automatically. In other embodiments, a user interface component (not shown) may be toggled by a user to generate a start time and an end time as a conversation progresses. Any conversation that takes place between the toggling of the user interface component may be subsequently (or in real-time) imported into the collection 115.

The client application 269 (FIG. 2) generates a user interface 106 for rendering in the display 109 of the client device 103 to enable a definition of the population criteria 233. Beginning with 803, population criteria 233 is received by the computing environment 203 from the client device 103. Next, in 806, creation and/or modification of files, documents, and/or conversations are monitored. For example, assuming a user established population criteria 233 that conversations made while the user is located in a particular location are automatically imported into a collection 115, the conversations performed by the client device 103 while at the particular location are monitored. Hence, geo-location of the client device 103 may be employed to identify whether the user is in the particular location and, if so, any conversations made while in that location will be imported into the collection 115 automatically without user intervention. Accordingly, in 809, it is determined whether the population criteria 233 set forth by the user have been satisfied. If the population criteria 233 have not been satisfied, the process proceeds to completion. Alternatively, the one or more client devices 103 satisfy the population criteria 233, the one or more files, documents, and/or conversations that satisfy the population criteria 233 are automatically uploaded to the computing environment 203 and associated with the corresponding collection 115. Thereafter, the process proceeds to completion.

Figure 9:
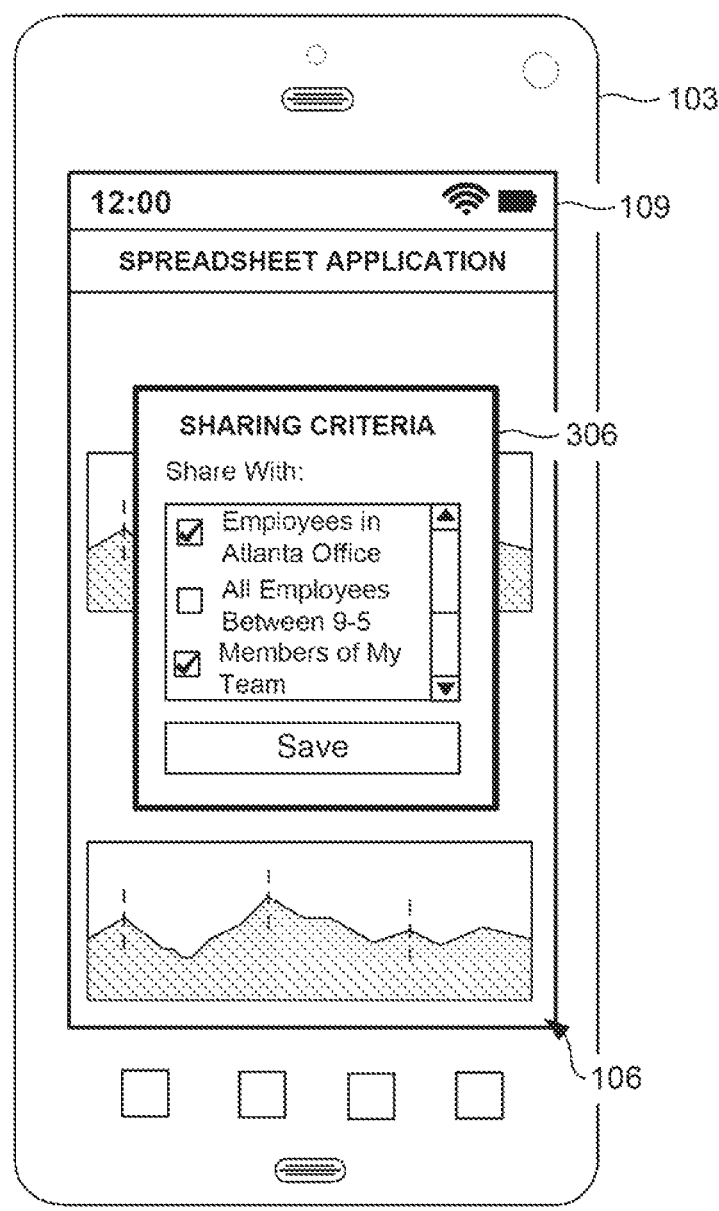
FIG. 9 is a drawing of a user interface for a client application rendered on a client device according to various embodiments of the present disclosure.

Moving on to FIG. 9, another scenario is shown where a client application 269 (FIG. 2) is executed on the client device 103. According to various embodiments described herein, a collection 115 may be shared, or access may be provided to the collection, automatically without user intervention. In various embodiments, sharing the collection 115 may include sending all or a portion of the files, documents, and/or conversations associated with the collection 115 to an authorized client device 103. A user of the client device 103 may establish automatic sharing criteria 236 in the dialog 306 that, when satisfied, causes a sharing of a collection 115, or a document and user-defined message in the collection 115, with one or more authorized users. For example, a user may want to share a collection 115 with all personnel physically located in a particular location (e.g., a building, an office, or another location). Geo-location of the client device 103 may be employed to identify whether the user is in the particular location and, if so, the collection 115 may be automatically shared with the one or more users. Another example may include a user desiring to share a collection 115 with one or more authorized users at a predefined time or during a period of time (e.g., during a meeting or during standard business hours). The user may establish the sharing criteria 236 in the dialog 306 according to the predefined time period that, when satisfied, automatically shares the collection 115 with the one or more authorized users.

Figure 10:
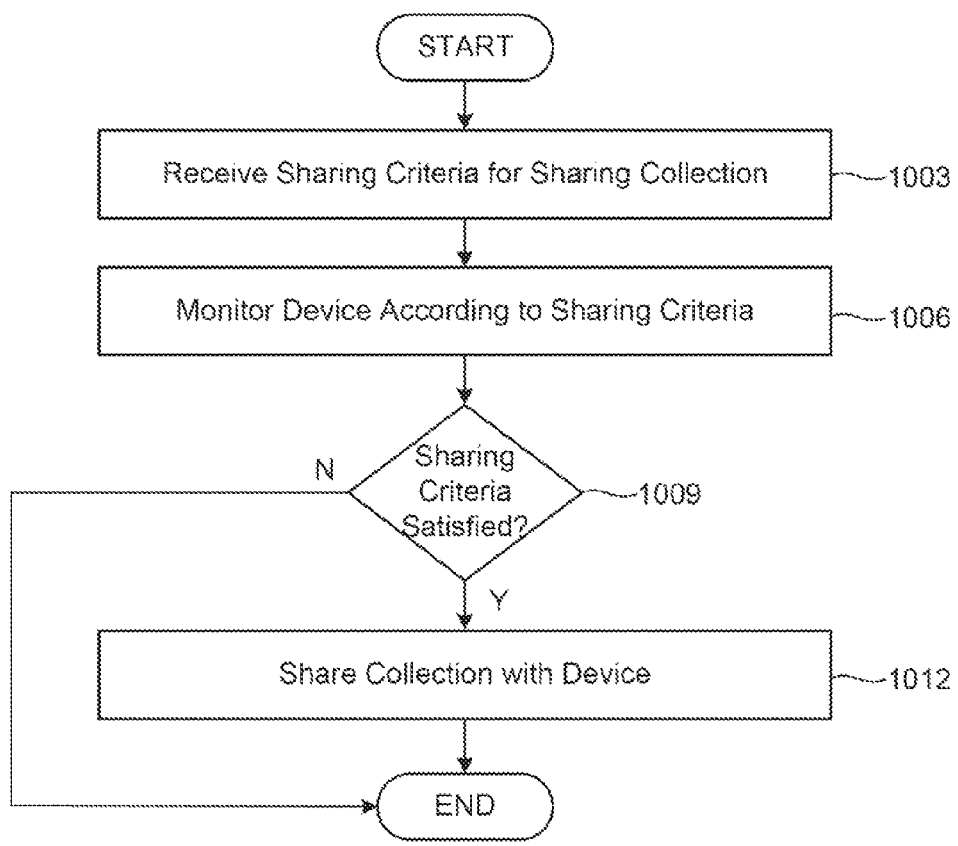
FIG. 10 is a flowchart illustrating an example of functionality implemented by components executed in the networked environment of FIG. 2 according to various embodiments of the present disclosure.

Referring next to FIG. 10, shown is a flowchart that provides one example of the operation of a portion of the collection control application 215 according to various embodiments. It is understood that the flowchart of FIG. 10 provides merely an example of the many different types of functional arrangements that may be employed to implement the operation of the portion of the collection control application 215 as described herein. As an alternative, the flowchart of FIG. 10 may be viewed as depicting an example of elements of a method implemented in the computing environment 203 (FIG. 2) according to one or more embodiments. Functionality attributed to the collection control application 215 can be implemented in a single process or application executed by the client device 103 and/or multiple processes or applications. The separation or segmentation of functionality as discussed herein is presented for illustrative purposes only.

Beginning with 1003, sharing criteria 236 is received by the computing environment 203 from the client device 103. As discussed above, a user of the client device 103 may establish automatic sharing criteria 236 that, when satisfied, causes a sharing of a collection 115, or a document and user-defined message 242 in the collection 115, with one or more authorized users. For example, a user may share a collection 115 with all personnel physically located in a particular location (e.g., a building, an office, or another location). The sharing criteria 236 set forth by the user may cause a sharing of a collection 115, or a document and user-defined message in the collection 115, with one or more authorized users when personnel is physically located in the particular location. In another example, a user may share a collection 115 with one or more authorized users at a predefined time or during a period of time (e.g., during a meeting or during standard business hours). Accordingly, the user may establish the sharing criteria 236 in the dialog 306 according to the predefined time period that, when satisfied, automatically shares the collection 115 with the one or more authorized users.

Next, in 1006, one or more client devices 103 are monitored. In the example of sharing a collection 115 with one or more authorized users when personnel is physically located in the particular location, geo-location of the client device 103 may be employed to identify whether the user is in the particular location. In 1006, it is determined whether the sharing criteria 236 have been satisfied. If the sharing criteria 236 are not satisfied, the process proceeds to completion. Alternatively, the one or more client devices 103 satisfy the sharing criteria 236, the collection 115 may be automatically shared with the one or more client device 103 (or users of the one or more client devices 103) in 1012. Thereafter, the process proceeds to completion.

The client devices 103 or devices comprising a computing environment 203 can include at least one processor circuit, for example, having a processor and at least one memory device, both of which are coupled to a local interface, respectively. Such a device may comprise, for example, at least one computer, a mobile device, smartphone, computing device or like device. The local interface may comprise, for example, a data bus with an accompanying address/control bus or other bus structure as can be appreciated.

Stored in the memory device are both data and several components that are executable by the processor. In particular, stored in the one or more memory device and executable by the processor of such a device can be the client application 269, and potentially other applications. Also stored in the memory may be a data store 212 and other data.

A number of software components are stored in the memory and are executable by a processor. In this respect, the term "executable" means a program file that is in a form that can ultimately be run by the processor. Examples of executable programs may be, for example, a compiled program that can be translated into machine code in a format that can be loaded into a random access portion of one or more of the memory devices and run by the processor, code that may be expressed in a format such as object code that is capable of being loaded into a random access portion of the one or more memory devices and executed by the processor, or code that may be interpreted by another executable program to generate instructions in a random access portion of the memory devices to be executed by the processor, etc. An executable program may be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor may represent multiple processors and/or multiple processor cores, and the one or more memory devices may represent multiple memories that operate in parallel processing circuits, respectively. Memory devices can also represent a combination of various types of storage devices, such as RAM, mass storage devices, flash memory, hard disk storage, etc. In such a case, a local interface may be an appropriate network that facilitates communication between any two of the multiple processors, between any processor and any of the memory devices, etc. The local interface may comprise additional systems designed to coordinate this communication, including, for example, performing load balancing. The processor may be of electrical or of some other available construction.

The client devices 103 may include a display 109 upon which a user interface 106 generated by the client application 269 or another application can be rendered. The client device 103 may also include one or more input/output devices that may include, for example, a capacitive touchscreen or other type of touch input device, fingerprint reader, keyboard, etc.

Although the collection control application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram and flowcharts show an example of the functionality and operation of an implementation of portions of components described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be convened from the source code, etc. If embodied in hardware, each block may represent a circuit or a number of interconnected circuits to implement the specified logical function(s).

Although the sequence diagram flowcharts show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in the drawings may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, solid-state drives, flash memory, etc. Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices. Additionally, it is understood that terms such as "application," "service," "system," "engine," "module," and so on may be interchangeable and are not intended to be limiting.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device, the program, when executed by the at least one computing device, being configured to cause the at least one computing device to at least:
    receive a plurality of files for storage in a data store from a plurality of client devices;

make the plurality of files accessible through a network-based file repository as a collection to the plurality of client devices having a client application executing thereon;

identify at least one user-defined message made in a communication window of the client application that pertains to one of the plurality of files;

store the user-defined message in the data store according to a message storage policy;

associate at least a portion of the user-defined message with the one of the plurality of files in the collection;

generate a manifest file that provides access to the portion of the user-defined message and the one of the plurality of files, wherein the manifest file is an extensible markup language (XML) document having data stored in a hierarchical arrangement, the manifest file comprising at least:

a location reference for individual ones of a plurality of files in the collection and the user-defined message stored inline in the XML document; and an indication that the portion of the user-defined message is associated with the one of the plurality of files in the collection;

receive a request to access the one of the plurality of files in the collection from one of the plurality of client devices; and in response to the request to access the one of the plurality of files being received:

identify the one of the plurality of files and the user-defined message pertaining to the one of the plurality of files in the collection from the manifest file; and provide the one of the plurality of files and the user-defined message for display in the client application.

2. The non-transitory computer-readable medium of claim 1, wherein the program, when executed by the at least one computing device, is further configured to cause the computing device to at least generate user interface data based at least in part on the manifest file, the user interface data generated to cause a rendering of a user interface in the one of the plurality of client devices, wherein the user interface comprises a link to the user-defined message and the at least one file in the collection of files.

3. The non-transitory computer-readable medium of claim 1, wherein the storing of the user-defined message in the at least one data store further comprises causing the at least one computing device to access the one of the plurality of files in the collection to extract the user-defined message from metadata in the one in the one of the plurality of files.

4. The non-transitory computer-readable medium of claim 1, wherein the user-defined message comprises content from an email, an instant message, or an annotated comment pertaining to the one of the plurality of files.

5. The non-transitory computer-readable medium of claim 1, further comprising program code that, when executed, causes the at least one computing device to:

determine whether the at least one computing device complies with at least one compliance rule;

in response to the at least one computing device failing to comply with the at least one compliance rule, disabling access to the plurality of files in the collection.

6. The non-transitory computer-readable medium of claim 1, further comprising program code that, when executed, causes the at least one computing device to automatically make the one of the plurality of files in the collection accessible in the client application in response to the one of the plurality of files satisfying predefined criteria.

7. The non-transitory computer-readable medium of claim 1, further comprising program code that, when executed, causes the at least one computing device to share the plurality of files in the collection with the one of the plurality of client devices in response to the one of the plurality of client devices being in compliance with at least one compliance rule.

8. A method, comprising:

receiving, by at least one computing device, a plurality of files for storage in a data store from a plurality of client devices;

making, by the at least one computing device, the plurality of files accessible through a network-based file repository as a collection to the plurality of client devices having a client application executing thereon;

identifying, by the at least one computing device, at least one user-defined message made in a communication window of the client application that pertains to one of the plurality of files;

storing, by the at least one computing device, the user-defined message in the data store according to a message storage policy;

associating, by the at least one computing device, the user-defined message the one of the plurality of files in the collection;

generating, by the at least one computing device, a manifest file that facilitates access to the user-defined message and the one of the plurality of files, wherein the manifest is an extensible markup language (XML) document having data stored in a hierarchical arrangement, the manifest file comprising at least:

a location reference for the user-defined message stored inline in the XML document and individual ones of the plurality of files in the collection stored inline in the XML document; and an indication that the user-defined message is associated with the one of the plurality of files in the collection;

receiving, by the at least one computing device, a request to access the one of the plurality of files in the collection from one of the plurality of client devices; and in response to the request to access the one of the plurality of files being received:

identify the one of the plurality of files and the user-defined message pertaining to the one of the plurality of files in the collection from the manifest file;

provide the one of the plurality of files and the user-defined message for display in the client application.

9. The method of claim 8, further comprising sharing, by the at least one computing device, the one of the plurality of files in the collection with the one of the plurality of client devices in response to the one of the plurality of client devices satisfying predefined sharing criteria.

10. The method of claim 8, further comprising automatically importing, by the at least one computing device, the one of the plurality of files into the collection in response to the one of the plurality of files satisfying predefined criteria.

11. The method of claim 8, wherein storing, by the at least one computing device, the user-defined message in the data store further comprises accessing, by the at least one computing device, the one of the plurality of files in the collection to extract the user-defined message from metadata of the one of the plurality of files.

12. The method of claim 9, wherein the user-defined message comprises content from an email, an instant message, or an annotated comment pertaining to the one of the plurality of files.

13. The method of claim 9, further comprising:
determining, by a second computing device, that the at least one computing device fails to comply with at least one compliance rule; and
in response to the at least one computing device failing to comply with the at least one compliance rule, disabling access, by the second computing device, to the plurality of files in the collection.

14. The method of claim 9, further comprising controlling, by the at least one computing device, access of the user-defined message and the one of the plurality of files to at least one authorized user.

15. A system, comprising:
at least one computing device; and
program instructions stored in memory and executable by the at least one computing device that, when executed, cause the at least one computing device to at least:
receive a plurality of files for storage in a data store from a plurality of client devices;
make the plurality of files accessible through a network-based file repository as a collection to the plurality of client devices having a client application executing thereon;
identify at least one user-defined message made in a communication window of the client application that pertains to one of the plurality of files;
store the user-defined message in the data store according to a message storage policy;
associate the user-defined message with the one of the plurality of files in the collection;
generate a manifest file that facilitates access to the user-defined message and the one of the plurality of files, the manifest file being an extensible markup language (XML) document having data stored in a hierarchical arrangement and comprising at least:
a location reference for individual ones of a plurality of files in the collection and the user-defined message stored inline in the XML document; and
an indication that the user-defined message is associated with the one of the plurality of files in the collection;
receive a request to access the one of the plurality of files in the collection from one of the plurality of client devices; and
in response to the request to access the one of the plurality of files being received:
identify the one of the plurality of files and the user-defined message pertaining to the one of the plurality of files in the collection from the manifest file; and
provide the one of the plurality of files and the user-defined message for display in the client application.

16. The system of claim 15, further comprising program instructions that, when executed, cause the at least one computing device to generate user interface data based at least in part on the manifest file, the user interface data generated to cause a rendering of a user interface in the one of the plurality of client devices, wherein the user interface comprises a link to the user-defined message and the one of the plurality of files in the collection.

17. The system of claim 15, further comprising program instructions that, when executed, cause the at least one computing device to enable access to the plurality of files in the collection to the one of the plurality of client devices in response to the one of the plurality of client devices being in compliance with at least one compliance rule.

18. The system of claim 15, further comprising program instructions that, when executed, cause the at least one computing device to import a file into the collection in response to the file satisfying predefined criteria.

19. The system of claim 15, wherein the user-defined message comprises content from an email, an instant message, or an annotated comment pertaining to the one of the plurality of files.

20. The system of claim 15, further comprising program instructions that, when executed, cause the at least one computing device to:
determine that the at least one computing device fails to comply with at least one compliance rule; and
in response to the at least one computing device failing to comply with the at least one compliance rule, disable access to the plurality of files in the collection.

* * * * *